United States Patent [19]

Brigden

[11] Patent Number: 4,975,017
[45] Date of Patent: Dec. 4, 1990

[54] GRAPPLE ATTACHMENT

[76] Inventor: Alexander L. Brigden, RR 8, Box 15, Moose Hts., Quesnel, British Columbia, Canada, V2J 5E6

[21] Appl. No.: 205,187

[22] Filed: Jun. 10, 1988

[51] Int. Cl.$^5$ .............................................. B66C 1/00
[52] U.S. Cl. .................................... 414/569; 414/680; 212/261
[58] Field of Search ............... 414/680, 569; 212/255, 212/260, 261, 265, 237, 238, 223; 172/474, 484; 56/10.7, 10.8; 254/325, 326, 335, 336, 333

[56] References Cited

U.S. PATENT DOCUMENTS

| | | | |
|---|---|---|---|
| 1,887,965 | 11/1932 | Stoner | 254/326 X |
| 2,505,923 | 5/1950 | Taylor et al. | 414/23 |
| 2,691,451 | 10/1954 | Westfall | 212/261 |
| 2,740,210 | 4/1956 | Hamborg | 414/23 |
| 3,630,243 | 12/1971 | Hamilton et al. | 144/3 D |
| 3,841,507 | 10/1974 | Barwise | 414/569 |
| 4,102,528 | 7/1978 | Cripe | 254/139.1 |
| 4,400,132 | 8/1983 | Deline et al. | 414/569 |
| 4,403,902 | 9/1983 | Sapelak | 414/569 |
| 4,582,206 | 4/1986 | Johnson | 212/261 X |

FOREIGN PATENT DOCUMENTS

| | | |
|---|---|---|
| 900141 | 5/1972 | Canada . |
| 906888 | 8/1972 | Canada . |
| 954164 | 9/1974 | Canada . |
| 1181369 | 1/1985 | Canada . |
| 1209174 | 8/1986 | Canada . |

OTHER PUBLICATIONS

Bridgen Manufacturing brochure "TREETOW—Introducing the New TREETOW Model 29", date unknown, 2 pages.
Esco Corporation, "Mechanized Forest Products Division Catalog 288", dated 11/74, 2 pages (showing Models 88 & 89 Straddle-Boom Skidding Grapples).
Esco Corporation, "Product Information—Catalog 275-0", dated 1986, 2 pages, (showing Model HV Boom Skidding Grapple and HI-VIS 518 Skidding Grapple).

Primary Examiner—David A. Bucci
Assistant Examiner—Donald W. Underwood
Attorney, Agent, or Firm—David A. Burge

[57] ABSTRACT

An arch structure serves to pivotally connect a grapple to a main frame of a tractor, an articulated wheel vehicle, or the like. An imaginary longitudinal axis extends substantially centrally with respect to the vehicle in forwardly and rearwardly extending directions. A winch has a casing that is mounted on the rear of the vehicle's main frame, and has a winch shaft that extends normal to the longitudinal axis of the vehicle. The arch structure is pivotally connected to the vehicle's main frame by means that includes a pair of side arms for detachable connection to the main frame of the vehicle, with means on the side arms for pivotally supporting the arch structure including a pivot pin connected to each of the side arms and in alignment with each end of the winch shaft. The arch structure includes spaced leg members, the lower ends of which are mounted on pivot pins arranged such that the pivot point of the arch structure is coaxial with but not connected to the axis of the winch shaft.

3 Claims, 7 Drawing Sheets

GRAPPLE ATTACHMENT

FIELD OF THE INVENTION

The present invention relates generally to the mounting of a
grapple attachment on a crawler tractor, articulated wheel vehicle or the like, as typically is used in the forest industry. More particularly, the invention relates to an arch structure for supporting a grapple or the like and which is detachably secured to a vehicle of the type mentioned above.

BACKGROUND OF THE INVENTION

Numerous forms of log skidding devices have been used on tractors and articulated vehicles in the forest industry. However, there has been a need for an easily detachable grapple structure which can be mounted and demounted from such vehicles. The apparatus according to the invention is particularly well suited for use in, but not limited to, skidding and related operations of the big tree forests of the western regions of Canada and the U.S.

Conventionally, grapple attachments and their associated support structures are permanently secured or are formed integrally with portions of with the frames of logging vehicles. In examples of conventional logging machines that are manufactured specifically for grapple work, they either cannot be converted or converted relatively quickly to other related operations such as line skidding, bull hook winching and the like.

SUMMARY OF THE INVENTION

The present invention addresses the foregoing and other needs by providing support and attachment means for connecting various types of grapples to a logging machine such as a crawler tractor. The mechanism functions to grapple skid and to line skid. It has pony arch capabilities incorporated into the structure and it can also winch directly off of its own winch without the arch interfering. Due to its detachable grapple arrangement, structure embodying the preferred practice of the present invention can be quickly converted to apparatus for winching culverts, tires, etc. Unlike many conventional devices, the design of structure that embodies the preferred practice of the present invention releases the winch of the associated tractor from any direct pulling support of the arch itself so that no wear and tear is applied to the winch in the event of side pull on the arch.

In preferred practice, structure embodying the present
invention utilizes a pair of side arms that are secured to a mounting or base plate that supports a winch of a crawler tractor. The base plate is modified to allow normal operation of the winch by the drive means of the tractor even though this base plate lies between the winch and the tractor frame. The side arms therefore extend outwardly from the base plate in the form of wing extensions that include pivot pin support means coaxial with and in alignment with either end of the shaft of the crawler winch. Pivot pins are mounted in the arm extensions and can be snubbed up against the terminal ends of the winch shaft. Bearing means located on the pivot pins serve to support the spaced legs of the arch structure which, in itself, incorporates a fairlead assembly including a fairlead roller and side rollers as well as an arch member at the top of the structure adjoining the spaced legs, the arch member including a box frame that removably supports a nose piece which in turn carries a grapple or the like.

In preferred practice, and due to the fact that the legs of the arch structure are mounted on the above mentioned pivot pins, the pivot point of the arch is at the center of the shaft of the winch, coaxial with it but not connected to it. Suitable ram means connected at one of their ends to either side arm and at their other, upper ends to the arch structure serve to swing the arch structure to the desired elevation about the above mentioned pivot points.

In preferred practice, it will be appreciated that the fairlead assembly, either through the fairlead roller itself or the side rollers, the arch structure and the side arms attached to the frame of the vehicle take all the load which is being winched, pulled or lifted, avoiding any transfer of that load to the winch itself. The fairlead roller can be relocated to a plurality of positions depending on the functions being carried out thereby.

According to one aspect of the preferred practice of the present invention, the invention relates to means for attaching a grapple or the like to a crawler tractor, articulated wheel vehicle or the like, the vehicle having a main frame and a winch casing mounted on the rear thereof and including a winch shaft positioned normal to the longitudinal axis of the vehicle. An arch structure and means for pivotally mounting the arch structure to the vehicle comprises a pair of side arms for detachable connection to the main frame of the vehicle, means on the side arms for pivotally supporting the arch structure and including a pivot pin mounted in each of said side arms and in alignment with each end of the winch shaft. Pivot pins are provided on said side arms and include support bearings thereon. The arch structure includes spaced leg members, the lower ends of which are mounted on the pivot pins whereby the pivot point of the arch structure is coaxial with but not connected to the axis of said winch shaft; and ram means are provided for arching the arch structure relative to the side arms.

The above and other features of the invention will be understood from the following disclosure and the accompanying drawings in which.

DETAILED DESCRIPTION OF THE PREFERRED EMBODIMENT

In preferred practice, the present invention may be considered as providing two main features: (a) a means for mounting an arch structure onto a vehicle, (a crawler tractor being disclosed and illustrated by way of example) and (b) a novel arch structure and its connection to the mounting means.

Figure 1:
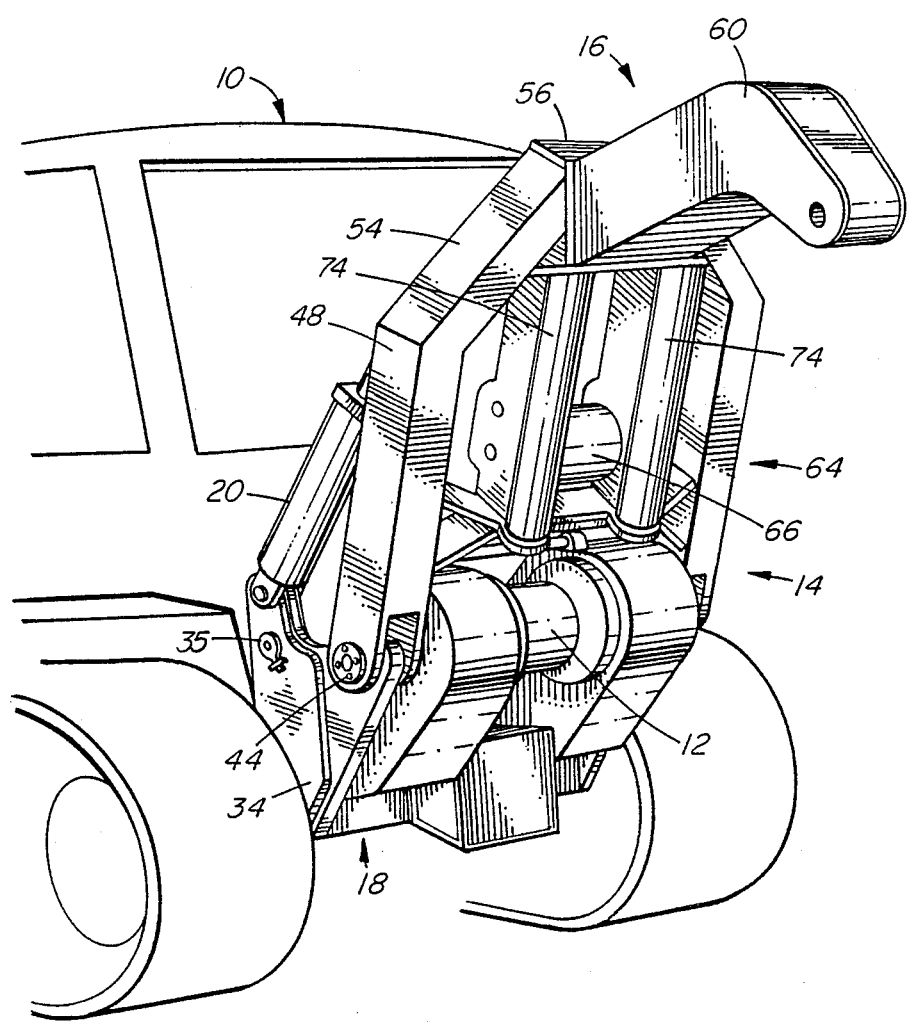
FIG. 1 is a fragmentary perspective view of a crawler tractor with the attachment that embodies the preferred practice of the present invention shown mounted on the rear thereof.

Looking firstly at FIG. 1, a rear portion of a crawler tractor 10 is schematically illustrated, the tractor having a winch 12 mounted to the rear end thereof. The grapple attachment 14 includes an arch structure generally illustrated at 16 which is detachably secured to the rear end of the tractor by mounting means illustrated at 18 and further interconnected thereto through a pair of hydraulic rams 20 only one of which is illustrated.

Figure 2:
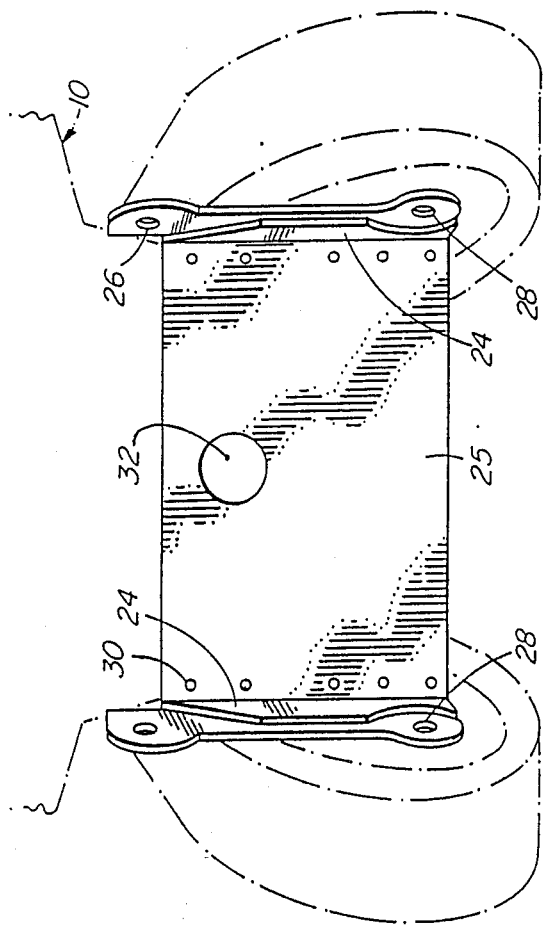
FIG. 2 is a frontal view of a mounting or base plate from which the attachment is suspended.
Figure 10:
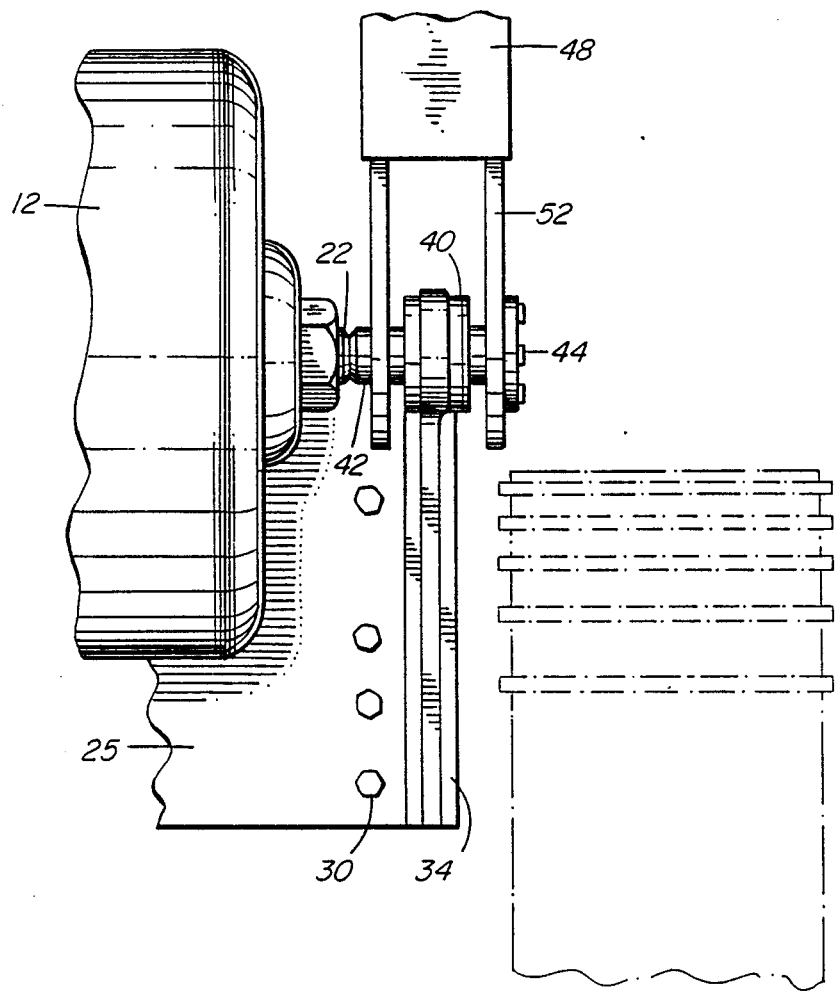
FIG. 10 is a fragmentary elevation view of one end of the attachment.

As shown in FIG. 10 the winch 12 includes a shaft 22 that is positioned normal to the longitudinal axis of the vehicle. The means for supporting the arch structure to the vehicle consists of a base or mounting plate 25 (FIG. 2) secured to the main frame (not shown) of the tractor 10 and is provided with a pair of angularly disposed, outwardly oriented wing plates 24, one at either end thereof, each of which is provided with an upper and lower aperture 26,28, the purpose of which will subsequently be described. The mounting plate 25, as illustrated, is provided with suitable bolts or studs 30 for the fastening of the winoh casing 12 thereto and is also provided with an aperture 32 which allows passage through the mounting plate of a drive shaft, not shown, from the gear box of the tractor to the gear box of the winch 12.

Figure 3:
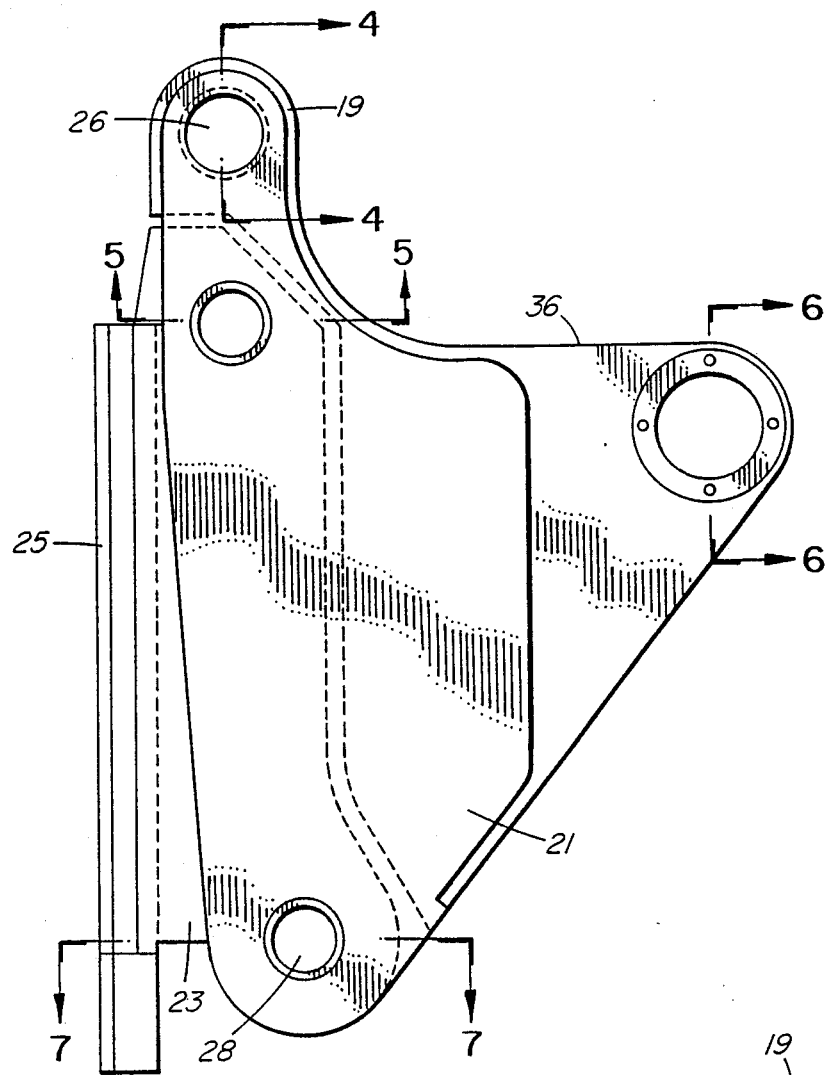
FIG. 3 is an elevational view of a side arm to be secured to the mounting plate of FIG. 2.
Figure 5:
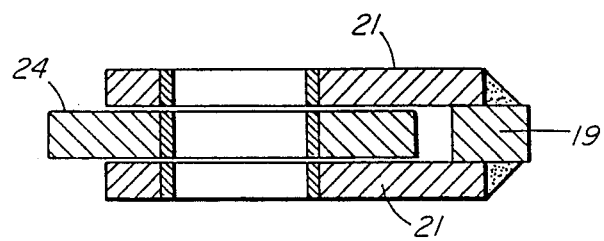
FIG. 5 is a cross-sectional view taken along the line 5—5 of FIG. 3.
Figure 4:
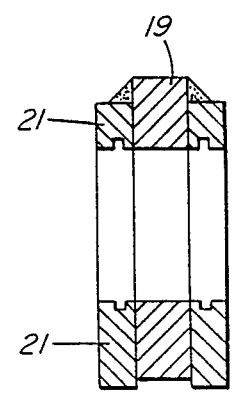
FIG. 4 is a cross-sectional view taken along the line 4—4 of FIG. 3.
Figure 6:
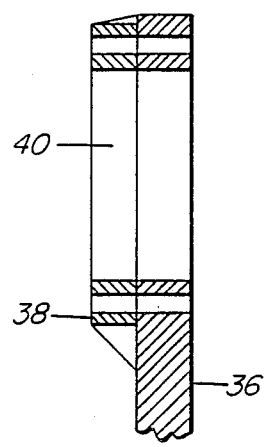
FIG. 6 is a cross-sectional view taken along the line 6—6 of FIG. 3.
Figure 7:
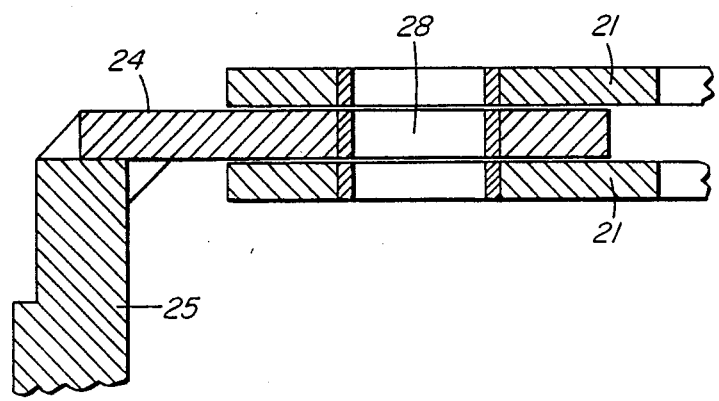
FIG. 7 is a cross-sectional view taken along the line 7—7 of FIG. 3.
Figure 8:
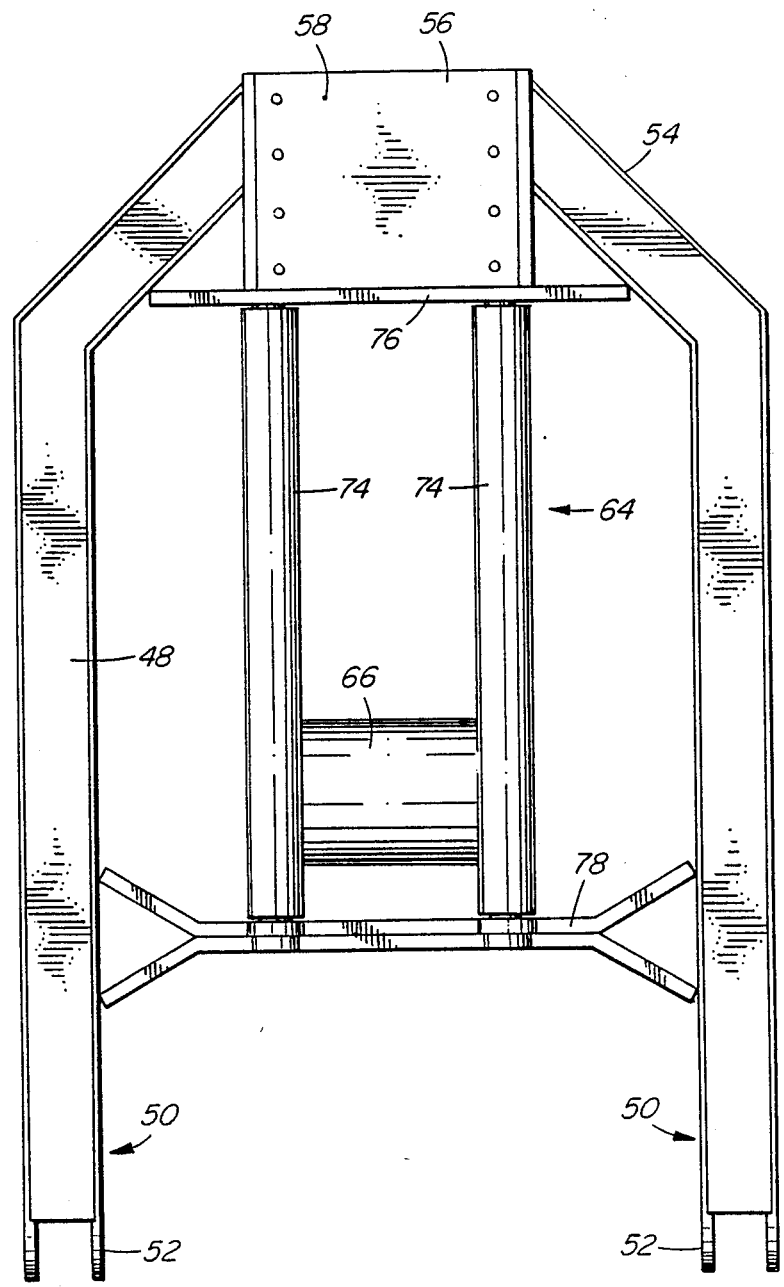
FIG. 8 is an elevational view of the arch structure.
Figure 9:
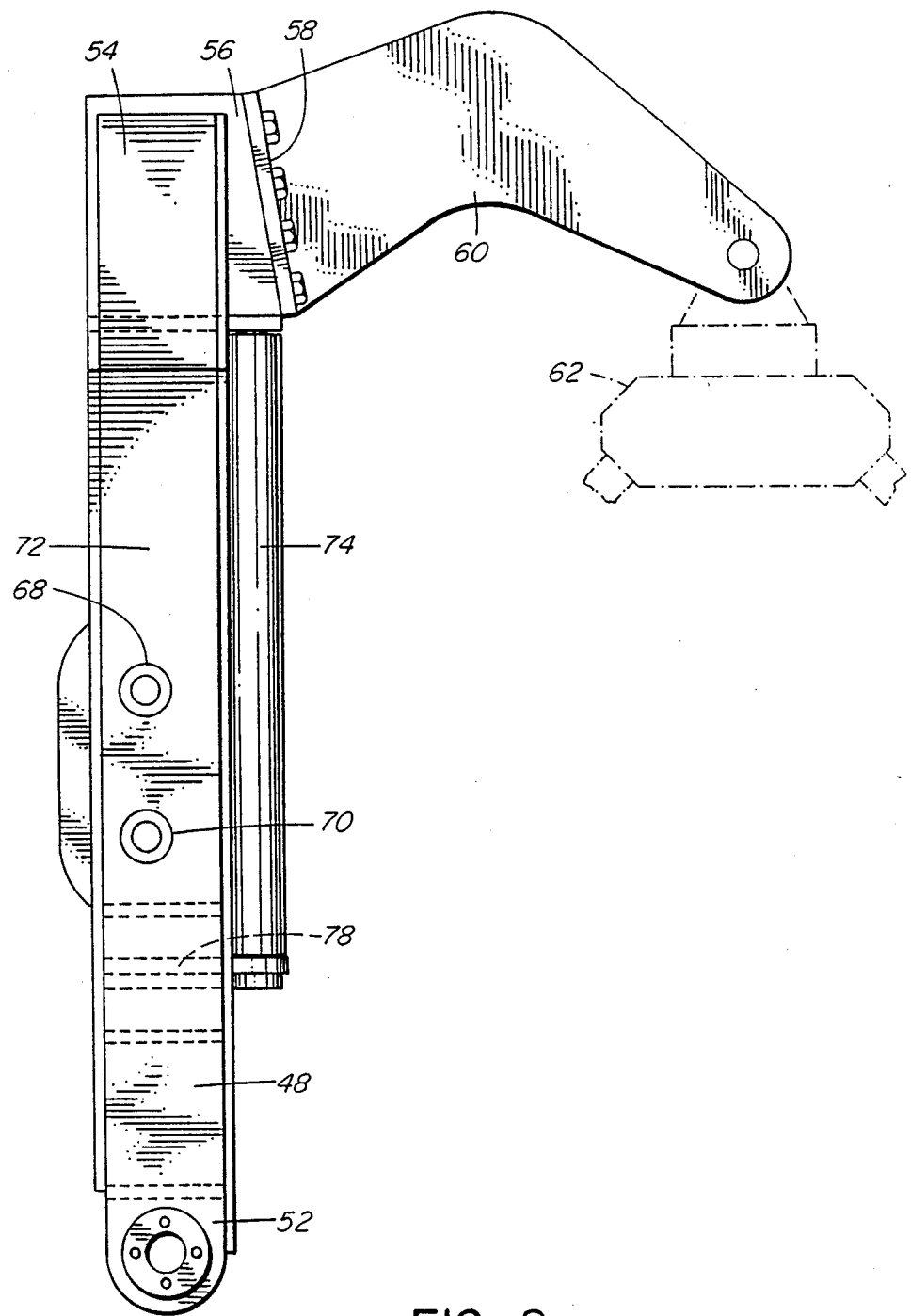
FIG. 9 is a side view of the arch structure that is depicted in FIG. 7.

A pair of side arms 34, one of which is shown in elevation in FIG. 3, each consists of a composite of plate portions 19, and 21 and are detachably secured to the wing plates 24 of the mounting member by detachable pins 35 shown in FIG. 1. One of the plates 19 of each arm 34 has an outwardly extending portion 36 which is provided with an aperture 38 therein coaxial with the winch shaft 22. Each aperture 38 incorporates a floating bearing 40 which provides a mount for a pivot pin 42, the inner ends thereof butting against the terminal ends of the winch shaft 22 as shown in FIG. 10. The pivot pins 42 are the main supports of the arch in the side arms 34. Tightening the bolts 44 (FIGS. 1 and 10) applies direct pressure to the pins and against the ends of the shaft 22 of the winch 12; the overall effect, considering the configuration of the arch structure works like a large C-clamp, clamping the arch against the ends of the shaft 22 of the winch. It will be appreciated that the side arms 34 take the force or load applied to the arch back into the main frame of the tractor 10 whereby the winch 12 itself is not subjected to any of the forces applied to the arch structure.

It will be further appreciated that by removal of the pins 35 shown in FIG. 1, the side arms 34 can be quickly removed from the mounting plate 25 and the tractor 10.

Turning now to FIGS. 1, 8, 9 and 10 the arch structure includes a pair of spaced leg members 48 of box construction, the lower ends 50 of which are provided with spaced ears 52 which serve to mount the legs 48 on the pivot pins 42 of the side arms. An A-frame section 54 interconnects the upper ends of the legs as illustrated and supports a box frame 56, the front plate 58 thereof being detachably secured to the box frame for mounting a nosepiece 60 that supports a grapple structure shown in phantom line at 62 or for supporting any other piece of apparatus relative to the function of the machine.

The arch structure includes a fairlead assembly 64 mounted between the leg members 48. The fairlead assembly can be welded in or bolted in, preferably the latter as this allows the fairlead to be taken out if it is not needed. The assembly includes a main, transverse fairlead roller 66 which can be located in either upper or lower locations 68,70 in side plates 72, and a pair of vertically oriented side rollers 74, pivotally mounted at their ends in upper and lower crossmembers 76,78 interconnecting the sides of the A-frame section 54 or the inner sides of the legs 48.

It will be appreciated that the removable nosepiece 60 allows an operator to adapt various forms of grapples to the arch and, because it is one complete unit, the operator can also change the height of the grapple head by repositioning the nosepiece 60 at a different angle or position. Additionally a nosepiece having a pivotal connection to the arch and which could be raised or lowered with respect thereto, could be used in place of the rigid nosepiece illustrated herein.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claimed.

I claim:

1. Means for attaching a grapple or the like to a crawler tractor, articulated wheeled vehicle or the like, said vehicle having a main frame and winch casing mounted on the rear thereof and including a winch shaft positioned normal to the longitudinal axis of said vehicle; an arch structure and means for pivotally mounting said arch structure to said vehicle comprising:
   (a) a pair of side arms for detachable connection to the main frame of said vehicle;
   (b) means on said side arms for pivotally supporting said arch structure and including a pivot pin mounted in each of said side arms and in alignment with each end of said winch shaft;
   (c) bearing means on said side arms and supporting said pivot pins thereon;
   (d) said arch structure including spaced leg members the lower ends thereof being mounted on said pivot pins whereby the pivot point of said arch structure is coaxial with but not connected to the axis of said winch shaft;
   (e) ram means for arcing said arch structure on said pivot pins of said side arms;
   (f) said arch structure further comprising an arch member interconnecting the upper ends of said leg members; a fairlead assembly mounted in said arch structure intermediate said leg members and including (i) a fairlead roller mounted therein with a rotary axis parallel to that of said winch shaft and pivot pins; (ii) a pair of spaced, parallel side rollers one adjacent each end of said fairlead roller, each side roller having a rotary axis normal to said fairlead roller; and (iii) a box frame at the top of said arch member, said box frame supporting said fairlead assembly at the upper end thereof and providing means for mounting a nose piece to said structure for supporting a grapple or the like from said attachment.

2. Means for attaching a grapple or the like to a crawler tractor, articulated wheeled vehicle or the like, said vehicle having a main frame and a winch casing mounted on the rear thereof, said winch casing including a winch shaft positioned normal to the longitudinal axis of said vehicle; said attachment means comprising;
  (a) a base plate secured to the chassis of said vehicle, said winch casing being mounted on said base plate;
  (b) a pair of side arms extending outwardly of the base plate and detachably connected thereto;
  (c) an arch structure and means for pivotally mounting said arch structure to said side arms of said base plate including pivot pin means mounted in each of said side arms and in axial alignment with each end of said winch shaft;
  (d) bearing means on said side arms and supporting said pivot pins therein;
  (e) said arch structure including spaced leg members with the lower ends thereof being mounted on said pivot pins so 3. The attachment means of claim 2 wherein said arch structure further comprises an arch member interconnecting the upper ends of said leg members; a fairlead assembly mounted in said arch structure intermediate said leg members and including (a) a fairlead roller mounted therein with a rotary axis parallel to that of said winch shaft and pivot pins; (b) a pair of spaced, parallel side rollers one adjacent each end of said fairlead roller, each side roller having a rotary axis normal to said fairlead roller; and (c) a box frame at the top of said arch member, said box frame supporting said fairlead assembly at the upper end thereof and providing means for mounting a nose piece to said structure for supporting a grapple or the like from said attachment.

* * * * *